(12) United States Patent
Huang et al.

(10) Patent No.: US 11,756,706 B2
(45) Date of Patent: Sep. 12, 2023

(54) PORTABLE CHARGING LIGHT-EMITTING CABLE FOR NEW ENERGY VEHICLES

(71) Applicant: FOSHAN JIEPIN TOY INDUSTRIAL CO., LTD., Foshan (CN)

(72) Inventors: Zhi Huang, Foshan (CN); Zhenjiang Qu, Foshan (CN)

(73) Assignee: FOSHAN JIEPIN TOY INDUSTRIAL CO., LTD., Foshan (CN)

( * ) Notice: Subject to any disclaimer, the term of this patent is extended or adjusted under 35 U.S.C. 154(b) by 0 days.

(21) Appl. No.: 17/741,456

(22) Filed: May 11, 2022

(65) Prior Publication Data

US 2022/0270785 A1 Aug. 25, 2022

(51) Int. Cl.
*B60L 53/18* (2019.01)
*H01B 7/18* (2006.01)
*H01B 9/00* (2006.01)

(52) U.S. Cl.
CPC .............. *H01B 9/003* (2013.01); *B60L 53/18* (2019.02); *H01B 7/18* (2013.01); *H01B 9/006* (2013.01)

(58) Field of Classification Search
CPC .......... H01B 9/003; H01B 7/18; H01B 9/006; H01B 7/17; H01B 7/29; H01B 7/295; H01B 7/22; H01B 7/28; H01B 7/282; H01B 13/2613; H01B 13/24; B60L 53/18
USPC ....................................................... 174/70 R
See application file for complete search history.

(56) References Cited

U.S. PATENT DOCUMENTS

| 8,958,671 B2* | 2/2015 | Cofre Luna | G02B 6/0003 385/100 |
| 2006/0087830 A1* | 4/2006 | Kelly | G02B 6/0005 362/217.1 |
| 2008/0302556 A1* | 12/2008 | Varkey | H01B 7/292 29/825 |
| 2013/0037323 A1* | 2/2013 | Smith | H01B 7/36 174/75 R |

(Continued)

FOREIGN PATENT DOCUMENTS

| CN | 106251950 A | * 12/2016 |
| CN | 209216606 U | * 8/2019 |

(Continued)

*Primary Examiner* — Timothy J Thompson
*Assistant Examiner* — Michael F Mcallister

(57) ABSTRACT

The present invention provides a portable charging light-emitting cable for new energy vehicles, including power configuration wires, a signal wire, electroluminescent wires, a filling layer and an outer protective sleeve. The power configuration wires are evenly arranged around the signal wire. At least more than two electroluminescent wires are mutually helically twisted with the power configuration wires in the same number of groups around an outer wall of the signal wire into a cable shape. Each electroluminescent wire is arranged between two adjacent power configuration wires. According to the present invention, the electroluminescence technology is incorporated into light-emitting charging cables. While charging, cables emit light evenly, which is suitable for charging observation at night, and rich colors are provided to play a warning role to prevent accidents. During the light-emitting process, light-emitting wires do not generate any heat, and energy consumption is extremely low.

7 Claims, 3 Drawing Sheets

(56) References Cited

U.S. PATENT DOCUMENTS

| | | | | |
|---|---|---|---|---|
| 2014/0318826 A1* | 10/2014 | Cai | ..................... | H01B 7/36 |
| | | | | 174/112 |
| 2015/0179307 A1* | 6/2015 | Ranganathan | ........... | H01B 3/40 |
| | | | | 174/113 R |
| 2017/0259676 A1* | 9/2017 | Goss | ..................... | B60L 53/16 |

FOREIGN PATENT DOCUMENTS

| | | | | |
|---|---|---|---|---|
| CN | 209880225 U | * | 12/2019 | |
| CN | 211828175 U | * | 10/2020 | |
| CN | 212782795 U | * | 3/2021 | |
| CN | 213400662 U | * | 6/2021 | |
| CN | 215988149 U | * | 3/2022 | |
| CN | 216450413 U | * | 5/2022 | |
| GB | 2587236 | * | 3/2021 | |
| WO | WO-2016023313 A1 | * | 2/2016 | ............... G08B 5/36 |

* cited by examiner

PORTABLE CHARGING LIGHT-EMITTING CABLE FOR NEW ENERGY VEHICLES

TECHNICAL FIELD

The present invention relates to the field of charging cables, and in particular to a portable charging light-emitting cable for new energy vehicles.

BACKGROUND

Electric vehicles are not only a major new energy trend in China, but for developed regions and countries, such as Europe and the United States, the increasing strictness on emissions has made foreign manufacturers accelerate development of electric vehicles. A difference between energy acquisition methods of the electric vehicles and traditional fuel vehicles lies in that: the refueling time of fuel vehicles only takes a few minutes, while the charging time of the electric vehicles is as short as tens of minutes and as slow as ten hours. Generally, users of the electric vehicles will choose a slow charge at night. At the same time, there are dedicated filling stations for the fuel vehicles to ensure the safety of the refueling process, while electric vehicle charging piles may be provided at underground garages, commercial centers and parking lots of enterprises and institutions, which have a large population flow and are unsupervised. Charging cables for the electric vehicles are long and prone to causing tripping when in poor light, especially when charging at night, without obvious warning, which causes interruption of charging or accidents.

In addition, the charging statuses of the electric vehicles can only be reflected by means of instruments at present. It is impossible to directly judge the charging statuses from cables, which is inconvenient and not intuitive enough, and interruption of charging or accidents are easily artificially caused.

There is a need for a new type of charging light-emitting cable now, which can illuminate at night, is convenient to be observed and can more intuitively reflect the charging statuses of the vehicles.

SUMMARY

The present invention provides a portable charging light-emitting cable for new energy vehicles. By means of technical transformation on an existing light-emitting cable structure, the problem that the existing charging cables have a relatively single function is solved.

In order to realize the above-mentioned objective, the technical solution adopted by the present invention is:

A portable charging light-emitting cable for new energy vehicles, including power configuration wires, a signal wire, electroluminescent wires, a filling layer and an outer protective sleeve, where the power configuration wires are evenly arranged around the signal wire; at least more than two electroluminescent wires are mutually helically twisted with the power configuration wires in the same number of groups around an outer wall of the signal wire into a cable shape; each electroluminescent wire is arranged between two adjacent power configuration wires; the filling layer is arranged at the exteriors of the electroluminescent wires and the power configuration wires by means of wrapping and covering; tensile structures are provided in the filling layer; and the transparent outer protective sleeve is arranged at the exterior of the filling layer.

Preferably, the tensile structures are a plurality of tensile ropes, which are threaded in the filling layer and are evenly spaced at the exteriors of the power configuration wires and the electroluminescent wires; and the filling layer is made of a transparent TPU material.

Preferably, the outer protective sleeve includes a wear-resistant layer made of a wear-resistant material, and a plurality of anti-skid grooves are formed in the outer surface of the outer protective sleeve.

Preferably, the outer protective layer includes a waterproof layer, which is arranged inside the wear-resistant layer.

Preferably, each electroluminescent wire includes a center electrode, a light-emitting coating, an external electrode and an electroluminescent wire protective sleeve. The light-emitting coating covers the exterior of the center electrode; the external electrode is arranged at the exterior of the light-emitting coating; and the electroluminescent wire protective sleeve is arranged outside the center electrode, the light-emitting coating and the external electrode.

Preferably, the light-emitting coating is a zinc sulfide coating.

Preferably, each electroluminescent wire protective sleeve is made of a transparent TPE material.

Preferably, each power configuration wire includes a wire core, an insulating layer, a shielding layer and a shielding filling layer. The wire core is covered with the insulating layer; the insulating layer is made of a TPE material, the shielding layer covers the exterior of the insulating layer; the shielding filling layer is arranged between the shielding layer and the insulating layer; and the shielding filling layer is made of a TPU material.

Preferably, the shielding layer includes an inner layer and an outer layer. The inner layer covers the exterior of the insulating layer and is a metal layer made of an aluminum foil; and the outer layer covers the exterior of the inner layer and is a metal mesh woven from copper wires.

The present invention has the beneficial effects that:

1) According to the present invention, the outer layer of the cable is provided with the wear-resistant layer and the waterproof layer. With the wear-resistant layer, the damage to wires due to friction is reduced, and the service life is prolonged. With a heat-absorbing layer, heat dissipation is facilitated, and the impact on the use of the wires when the temperature is too high is avoided. With the waterproof layer, the impact on the wires due to external water vapor etc. is avoided to ensure the safety.

2) According to the present invention, the electroluminescence technology is integrated into the light-emitting charging cable. While charging, the cable emits soft light evenly, which is suitable for charging observation at night, and rich colors are provided to play a warning role to prevent accidents. During the light-emitting process, light-emitting wires do not generate any heat so that energy consumption is extremely low, are good in shock resistance to be not easy to fail in charging due to serious external shocks, and are subjected to light-emitting control integration processing, so that the light-emitting life thereof may reach 10,000 hours. The charging cable is made of a halogen-free material; TPE material is adopted for insulation, which meets the requirements of S90 insulation material in the CQC standard; and the outer protective sleeve is made of the TPU material. The light-emitting wires are resistant to bending and wear, are more flexible than other products and are certainly elastic.

3) In addition, circuit control may further be available to realize various light-emitting modes such as dynamic flickering. According to the present invention, the electroluminescent wires may further be controlled to emit light of different colors during charging or if a full charged status is detected, so as to realize a color change function during charging. For example, the color changes to red during charging and green if the full charged status is detected. Users may directly observe the charging statuses of the electric vehicles from the light-emitting statuses of the cables, and display is more convenient and intuitive.

4) The present invention adopts a form of the electroluminescent wires, a light-emitting body occupies a small volume, which can shorten the diameter of the cable and facilitate storage and carrying.

Figure 1:
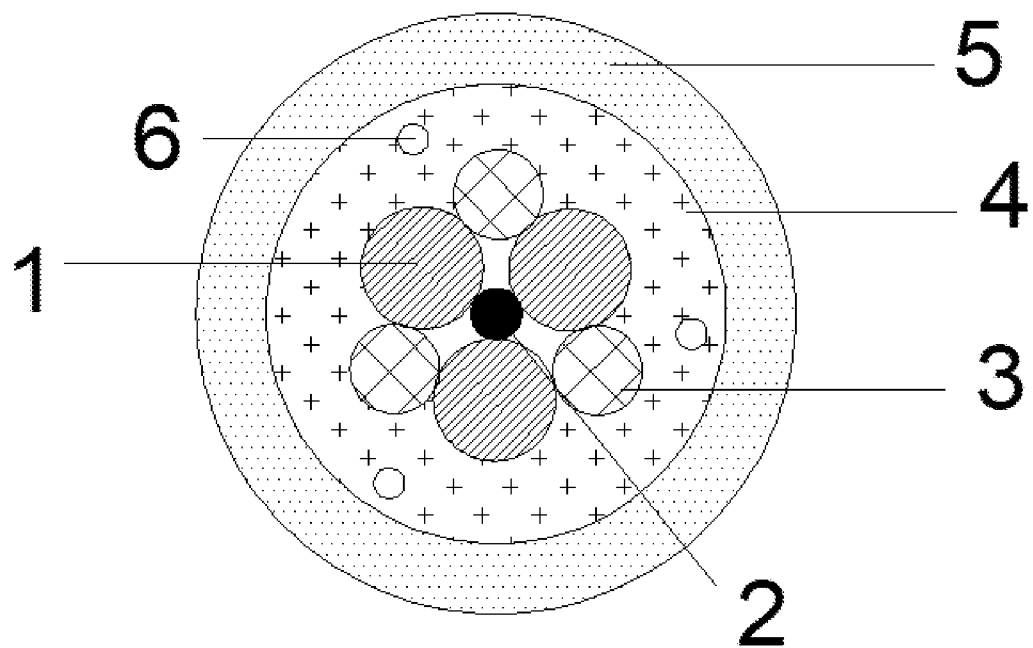
FIG. 1 is a cross-sectional structural schematic diagram of the present invention.

REFERENCE NUMBER LISTING IN DRAWINGS power configuration wire 1, wire core 11, insulating layer 12, shielding layer 13, shielding filling layer 14, signal wire 2, electroluminescent wire 3, center electrode 31, light-emitting coating 32, external electrode 33, electroluminescent wire protective sleeve 34, filling layer 4, outer protective sleeve 5, wear-resistant layer 51, waterproof layer 52, anti-skid groove 53, tensile structure 6, and tensile rope 61.

DETAILED DESCRIPTION

Figure 2:
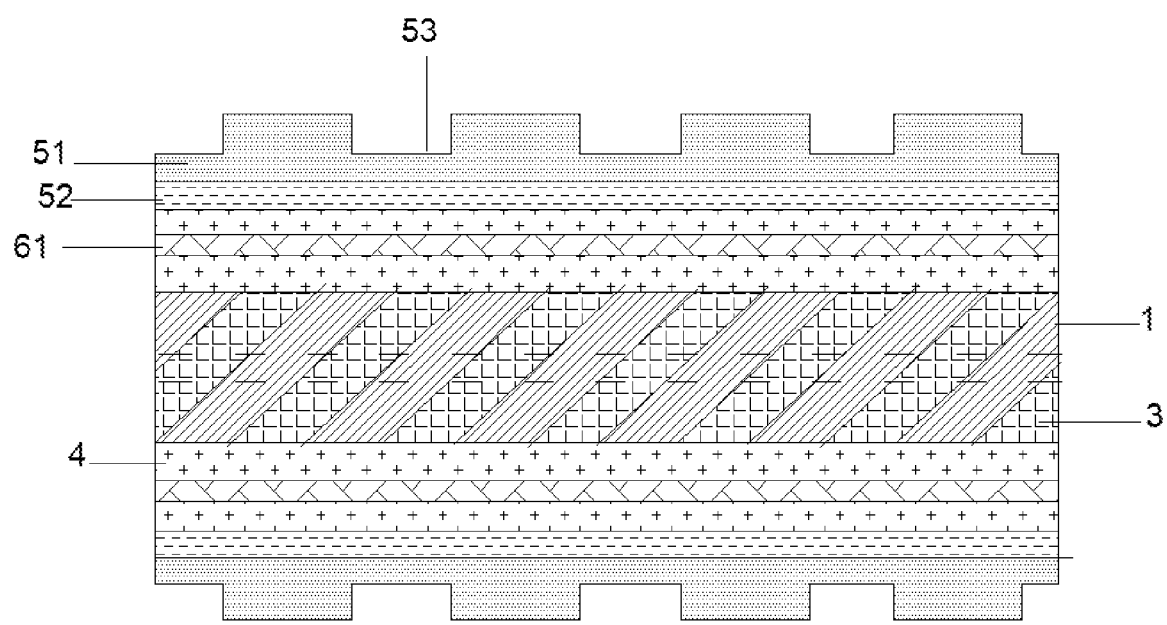
FIG. 2 is a schematic cross-sectional diagram of the present invention.
Figure 3:
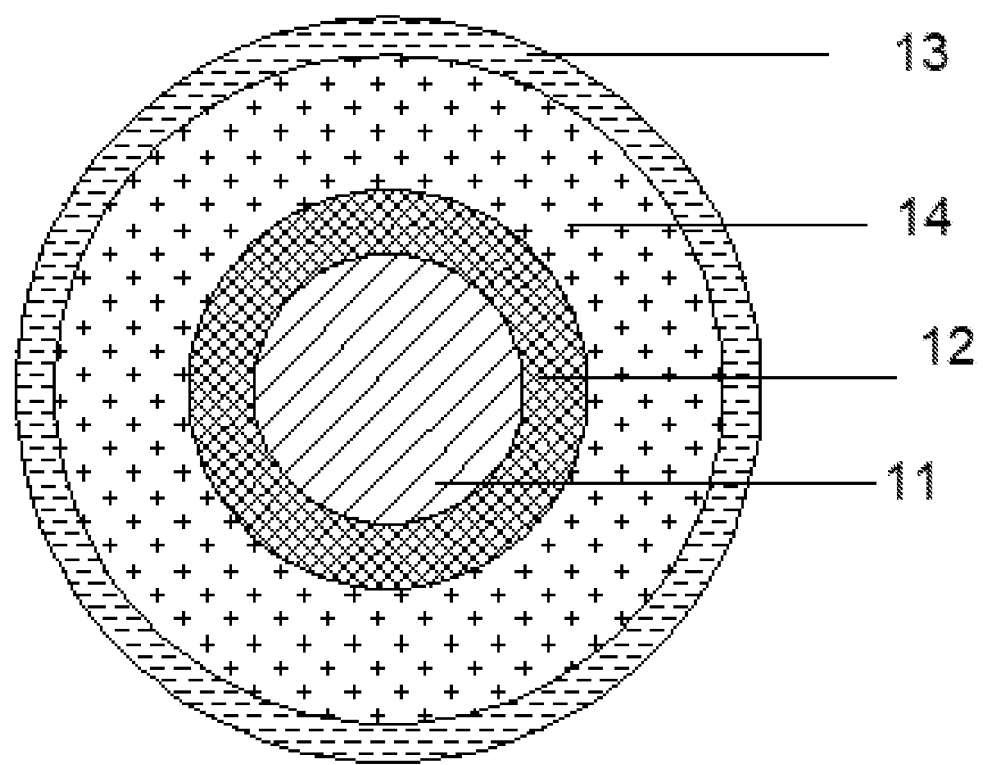
FIG. 3 is a schematic diagram of power configuration wires of the present invention.
Figure 4:
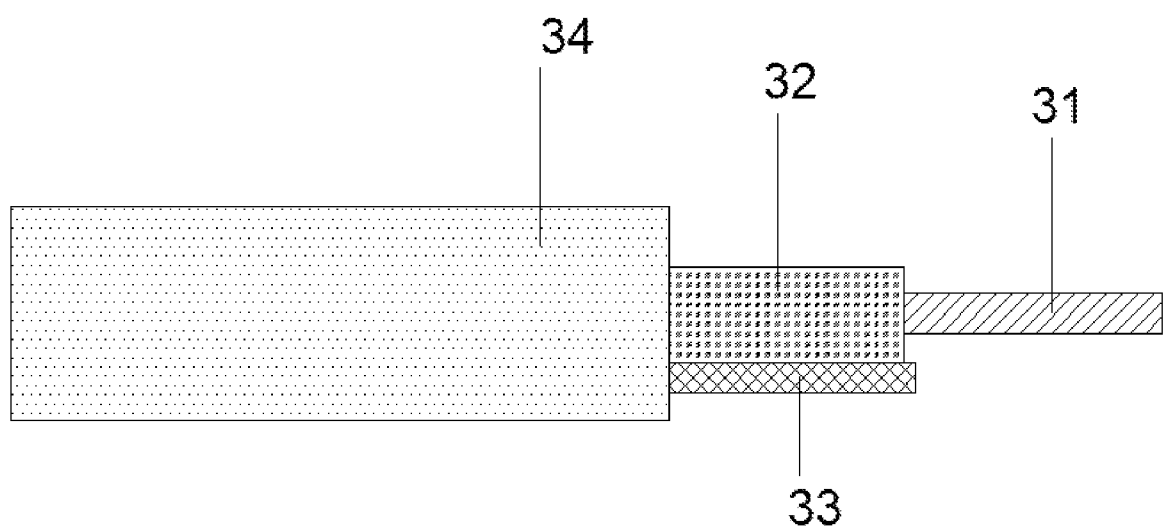
FIG. 4 is a schematic diagram of electroluminescent wires of the present invention.

As shown in FIGS. 1-4, the present invention provides a portable charging light-emitting cable for new energy vehicles, including power configuration wires 1, a signal wire 2, electroluminescent wires 3, a filling layer 4 and an outer protective sleeve 5. The power configuration wires 1 are evenly arranged around the signal wire 2. At least more than two electroluminescent wires 3 are mutually helically twisted with the power configuration wires 1 in the same number of groups around an outer wall of the signal wire 2 into a cable shape. Each electroluminescent wire 3 is arranged between two adjacent power configuration wires 1. The filling layer 4 is arranged at the exteriors of the electroluminescent wires 3 and the power configuration wires 1 by means of wrapping and covering. Tensile structures 6 are provided in the filling layer 4. A transparent outer protective sleeve 5 is arranged at the exterior of the filling layer 4.

Further, in order to obtain the tensile performance of the cable, the tensile structures 6 are a plurality of tensile ropes 61, which are threaded in the filling layer 4 and are evenly spaced at the exteriors of the power configuration wires 1 and the electroluminescent wires 3. The filling layer 4 is made of a transparent TPU material.

Further, in order to add the wear-resistant and anti-skid performance of the cable, the outer protective sleeve 5 includes a wear-resistant layer 51 made of a wear-resistant material, and a plurality of anti-skid grooves 53 are formed in the outer surface of the outer protective sleeve 5. The plurality of anti-skid grooves 53 are annularly arranged at the peripheral side of the outer protective sleeve 5.

Further, in order to add the waterproof performance of the cable, an outer protective layer includes a waterproof layer 52, which is arranged inside the wear-resistant layer 51.

In embodiment 1, there are three power configuration wires 1 and three electroluminescent wires 3.

Further, each electroluminescent wire 3 includes a center electrode 31, a light-emitting coating 32, an external electrode 33 and an electroluminescent wire protective sleeve 34. The light-emitting coating 32 covers the exterior of the center electrode 31; the external electrode 33 is arranged at the exterior of the light-emitting coating 32; and the electroluminescent wire protective sleeve 34 is arranged outside the center electrode 31, the light-emitting coating 32 and the external electrode 33.

Further, the light-emitting coating 32 is a zinc sulfide coating.

Further, each electroluminescent wire protective sleeve 34 is made of a transparent TPE material.

Further, each power configuration wire 1 includes a wire core 11, an insulating layer 12, a shielding layer 13 and a shielding filling layer 14. The wire core 11 is covered with the insulating layer 12. The insulating layer 12 is made of a TPE material. The shielding layer 13 covers the exterior of the insulating layer 12. The shielding filling layer 14 is arranged between the shielding layer 13 and the insulating layer 12. The shielding filling layer 14 is made of a TPU material.

Further, the shielding layer 13 includes an inner layer and an outer layer. The inner layer covers the exterior of the insulating layer 12 and is a metal layer made of an aluminum foil, and the outer layer is covered at the exterior of the inner layer and is a metal mesh woven from copper wires.

A method for manufacturing a portable charging light-emitting cable for new energy vehicles, including the following steps of:

S1, making power configuration wires, wrapping an insulating layer outside copper wire conductors, then covering the insulating layer with a shielding filling layer, and wrapping the shielding filling layer with a shielding layer;

S2, making a signal wire, and wrapping the copper wire conductors with a signal insulating layer;

S3, making electroluminescent wires, coating center electrode wires of the electroluminescent wires with zinc sulfide light-emitting coatings, winding external electrodes on the outer sides of the light-emitting coatings, and wrapping the center electrodes, the light-emitting coatings and the external electrodes of the electroluminescent wires with electroluminescent wire protective sleeves made of a TPE material;

S4, forming the above-mentioned power configuration wires, signal wire and electroluminescent wires into a cable, and mutually helically twisting, by means of a winding machine, the electroluminescent wires with the power configuration wires in the same number of groups around an outer wall of the signal wire into a cable shape; and S5, making an outer protective layer, and wrapping the outer layer of the stranded cable with the filling layer, the waterproof layer and the wear-resistant sleeve so as to complete the cable production.

When an alternating voltage is applied to the center electrodes and the external electrodes, an electric field causes zinc sulfide particles to produce excitation transitions, thereby emitting EL (cold light) in each charge and discharge cycle. When different activators are contained, light of different colors may be emitted. The brightness of the EL (cold light) changes with changes of voltage and frequency between electrodes, and generally increases accordingly with the increase of the voltage and the frequency.

The present invention has the following characteristic that:

1) According to the present invention, the outer layer of the cable is provided with the wear-resistant layer and the waterproof layer. With the wear-resistant layer, the damage to wires due to friction is reduced, and the service life is prolonged. With a heat-absorbing layer, heat dissipation is facilitated, and the impact on the use of wires when the temperature is too high is avoided. With the waterproof layer, the impact on wires due to external water vapor etc. is avoided to ensure the safety.

2) According to the present invention, the electroluminescence technology is integrated into the light-emitting charging cable. While charging, the cable emits soft light evenly, which is suitable for charging observation at night, and rich colors are provided to play a warning role to prevent accidents. During the light-emitting process, light-emitting wires do not generate any heat so that the energy consumption is extremely low, are good in shock resistance to be not easy to fail in charging due to serious external shocks, and are subjected to light-emitting control integration processing so that the light-emitting life thereof may reach 10,000 hours. The charging cable is made of a halogen-free material; the TPE material is adopted for insulation, which meets the requirements of S90 insulation material in the CQC standard; and the outer protective sleeve is made of the TPU material. The light-emitting wires are resistant to bending and wear, and are more flexible than other products and are certainly elastic.

3) In addition, circuit control may further be available to realize various light-emitting modes such as dynamic flickering. According to the present invention, the electroluminescent wires may further be controlled to emit light of different colors during charging or if a full charged status is detected, so as to realize color change during charging. For example, the color changes to red during charging and green if the full charged status is detected. Users may directly observe the charging statuses of electric vehicles from the light-emitting status of the cable, and display is more convenient and intuitive.

4) The present invention adopts a form of electroluminescent wires, a light-emitting body occupies a small volume, which can shorten the diameter of the cable and facilitate storage and carrying.

It is finally noted that the above-mentioned embodiments are only used to illustrate rather than to limit the technical solutions of the present invention. Although the present invention has been described in detail with reference to the preferred embodiments, a person of ordinary skill in the art should understand that modifications or equivalent replacements can be made to the technical solutions of the present invention without departing from the spirit and the scope of the technical solutions of the present invention, and should all be included in the scope of claims of the present invention.

Standard parts used in the present invention can be purchased from the market, and special-shaped parts can all be customized according to the description and the accompanying drawings. Specific connection modes of individual parts all adopt mature conventional means such as bolts, rivets and welding in the prior art; machinery, parts and equipment all use conventional models in the prior art; and circuit connections adopt a conventional connection mode in the prior art, which will not be described in detail here.

In the descriptions of the present invention, unless otherwise expressly specified and limited, the terms "installed", "connected", "connecting" and "fixed" should be understood in a broad sense. For example, it may be a fixed connection or a detachable connection, or integrated; it may be a mechanical connection or an electrical connection; and it may be a direct connection, or a connection by means of an intermediate medium, and may be a communication between two elements or an interaction relationship between two elements. For a person skilled in the art, the specific meanings of the above-mentioned terms in the present invention can be understood according to specific situations.

The invention claimed is:

1. A portable charging light-emitting cable for new energy vehicles, comprising power configuration wires, a signal wire, electroluminescent wires, a filling layer and an outer protective sleeve, wherein the power configuration wires are evenly arranged around the signal wire; at least more than two electroluminescent wires are mutually helically twisted with the power configuration wires in the same number of groups around an outer wall of the signal wire into a cable shape; each electroluminescent wire is arranged between two adjacent power configuration wires; the filling layer is arranged at the exteriors of the electroluminescent wires and the power configuration wires by means of wrapping and covering; tensile structures are provided in the filling layer; and a transparent outer protective sleeve is arranged at the exterior of the filling layer;

wherein the outer protective sleeve comprises a wear-resistant layer made of a wear-resistant material, and a plurality of anti-skid grooves are formed in the outer surface of the outer protective sleeve; and wherein the outer protective layer comprises a waterproof layer, which is arranged inside the wear-resistant layer.

2. The portable charging light-emitting cable for new energy vehicles according to claim 1, wherein the tensile structures are a plurality of tensile ropes, which are threaded in the filling layer and are evenly spaced at the exteriors of the power configuration wires and the electroluminescent wires; and the filling layer is made of a transparent TPU material.

3. The portable charging light-emitting cable for new energy vehicles according to claim 1, wherein each electroluminescent wire comprises a center electrode, a light-emitting coating, an external electrode and an electroluminescent wire protective sleeve; the light-emitting coating covers the exterior of the center electrode; the external electrode is arranged at the exterior of the light-emitting coating; and the electroluminescent wire protective sleeve is arranged outside the center electrode, the light-emitting coating and the external electrode.

4. The portable charging light-emitting cable for new energy vehicles according to claim 3, wherein the light-emitting coating is a zinc sulfide coating.

5. The portable charging light-emitting cable for new energy vehicles according to claim 3, wherein each electroluminescent wire protective sleeve is made of a transparent TPE material.

6. A portable charging light-emitting cable for new energy vehicles, comprising power configuration wires, a signal wire, electroluminescent wires, a filling layer and an outer protective sleeve, wherein the power configuration wires are evenly arranged around the signal wire; at least more than two electroluminescent wires are mutually helically twisted with the power configuration wires in the same number of groups around an outer wall of the signal wire into a cable shape; each electroluminescent wire is arranged between two adjacent power configuration wires; the filling layer is arranged at the exteriors of the electroluminescent wires and the power configuration wires by means of wrapping and covering; tensile structures are provided in the filling layer; and a transparent outer protective sleeve is arranged at the exterior of the filling layer, wherein each power configuration wire comprises a wire core, an insulating layer, a shielding layer and a shielding filling layer; the wire core is covered with the insulating layer; the insulating layer is made of TPE material; the insulating layer is covered with the shielding layer; the shielding filling layer is arranged between the shielding layer and the insulating layer; and the shielding filling layer is made of a TPU material.

7. The portable charging light-emitting cable for new energy vehicles according to claim 6, wherein the shielding layer comprises an inner layer and an outer layer; the inner layer covers the exterior of the insulating layer and is a metal layer made of an aluminum foil; and the outer layer covers the exterior of the inner layer and is a metal mesh woven from copper wires.

\* \* \* \* \*